US006261645B1

(12) United States Patent
Betz et al.

(10) Patent No.: US 6,261,645 B1

(45) Date of Patent: Jul. 17, 2001

(54) PROCESS FOR PRODUCING SCRATCH RESISTANT COATINGS AND ITS USE, IN PARTICULAR FOR PRODUCING MULTILAYERED COATS OF ENAMEL

(75) Inventors: Peter Betz, Miinster; Uwe Meisenburg, Duisburg; Rainer Kleimann, Altenberge; Karl-Heinz Joost, Troisdorf; Andrea Hesselmaier, Drensteinfurt, all of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/403,688

(22) PCT Filed: Sep. 17, 1998

(86) PCT No.: PCT/EP98/00860

§ 371 Date: Nov. 5, 1999

§ 102(e) Date: Nov. 5, 1999

(87) PCT Pub. No.: WO98/40171

PCT Pub. Date: Sep. 17, 1998

(30) Foreign Application Priority Data

Mar. 7, 1997 (DE) .............................................. 197 09 467

(51) Int. Cl.[7] ........................................................ C08J 7/18

(52) U.S. Cl. ........................... 427/500; 252/1; 427/385.5; 427/407.1; 427/409; 427/514; 427/551; 427/558; 427/559

(58) Field of Search ..................................... 427/500, 514, 427/551, 558, 559, 385.5, 388.1, 407.1, 409; 252/1

(56) References Cited

U.S. PATENT DOCUMENTS

| | | |
|---|---|---|
| 4,029,842 | 6/1977 | Yoshida et al. . |
| 5,565,243 | 10/1996 | Mauer et al. . |
| 5,609,918 | 3/1997 | Yamaguchi et al. . |
| 5,716,678 | 2/1998 | Röckrath et al. . |

FOREIGN PATENT DOCUMENTS

| | | | |
|---|---|---|---|
| 8 20 03 579 | 7/1970 | (DE) | C07C/69/54 |
| 33 16 593 | 5/1983 | (DE) | C08G/63/76 |
| 38 36 370 | 5/1990 | (DE) | C08G/63/91 |
| 43 10 414 A1 | 3/1993 | (DE) . | |
| 43 41 235 A1 | 12/1993 | (DE) . | |
| 4341235 | 12/1993 | (DE) . | |
| 0 002 866 | 12/1978 | (EP) | C08F/283/00 |
| 0 054 105 | 9/1981 | (EP) | C08G/63/46 |
| 0 204 161 | 5/1986 | (EP) | C08G/18/50 |
| 0 540 884 | 10/1992 | (EP) | B05D/3/06 |
| 568 967 | 5/1993 | (EP) | B05D/3/00 |
| 0 688 841 A2 | 6/1995 | (EP) . | |
| 0 727 468 A2 | 2/1996 | (EP) . | |
| 0 774 499 A2 | 11/1996 | (EP) . | |

OTHER PUBLICATIONS

J.L. Courter, 23$^{rd}$ Annual International Waterborne, High–Solids and Powder Coatings Symposium, New Orleans 1996 (No month avail.).

B.V. Gregorovich and P.,T. McGonical, Proceedings of the Advanced Coatings Technology Conference, Illinois, usA,. Nov. 3–5, 1992, pp. 121–125.

S. Sano et al., "Relationship between Viscoelastic Property and Scratch Resistance of Top–Coat Clear Film",; Toso Kagaku 1994, 29 (12), pp. 475–480 (No month avail.).

P. Betz and A. Bartelt in Progress in organic Coatings, 22 (1993), pp. 27–37 (No month avail.).

Loren W. Hill, Journal of Coatings Technology, vol. 64, No. 808, May 1992, pp. 29 to 41.

Rösler, E. Klinke and G. Kunz in Farbe + Lack, vol. 10, 1994, pp. 837–843 (No month avail.).

Murayama, T., Dynamic Mechanical Analysis of Polymeric Material, Elsevier, New York, 1978 and. (No month avail.).

Loren W Hill, Journal of Coatings Technology, vol. 64, No. 808, May 1992, pp. 31–33.

*Primary Examiner*—Bernard Pianalto

(57) ABSTRACT

The present invention relates to a process for producing scratch-resistant coatings which comprises applying a coating composition which in the cured state has a storage modulus E' in the rubber-elastic range of at least $10^{7.6}$ Pa and a loss factor tan δ at 20° C. of not more than 0.10, the storage modulus E'0 and the loss factor having been measured by dynamic mechanical thermoanalysis on homogeneous free films having a film thickness of 40±10 μm. The present invention additionally relates to the use of the process for producing multicoat finishes and also to coating compositions suitable for this process.

23 Claims, No Drawings

PROCESS FOR PRODUCING SCRATCH RESISTANT COATINGS AND ITS USE, IN PARTICULAR FOR PRODUCING MULTILAYERED COATS OF ENAMEL

This application is a 371 of PCT EP98/00860, Sep. 17, 1998.

FIELD OF THE INVENTION

The present invention relates to a process for producing scratch-resistant coatings, especially scratch-resistant multicoat finishes.

The present invention relates, furthermore, to coating compositions suitable for this process.

BACKGROUND OF THE INVENTION

In past years, great progress has been made in developing acid-resistant and etch-resistant clearcoats for the OEM finishing of automobiles. More recently, there is now an increasing desire in the automotive industry for scratch-resistant clearcoats which at the same time retain the level attained hitherto in terms of their other properties.

At present, however, there are different test methods for the quantitative assessment of the scratch resistance of a coating, examples being testing by means of the BASF brush test, by means of the washing brush unit from the company AMTEC, or various test methods of automakers and others. A disadvantage, however, is that it is not possible in every case to correlate the individual test results. In other words, the test results for one and the same coating may have very different outcomes result depending on the test method chosen, and passing one scratch resistance test does not, under certain circumstances, permit conclusions to be drawn about the behavior of that coating in a different scratch test.

There is, therefore, a desire for a method of quantitatively assessing the scratch resistance which enables reliable statements to be made about the scratch resistance of the coating from just one examination of the sample. In particular, the result of this examination should permit reliable conclusions to be drawn about the scratch resistance of the coating in the various abovementioned scratch resistance tests.

The literature, indeed, has already described a number of investigations relating to the physical processes taking place during the production of scratches, and correlations derived therefrom, between the scratch resistance and other physical parameters of the coating. A contemporary review of various literature relating to scratch-resistant coatings can be found, for example, in J. L. Courter, 23$^{rd}$ Annual International Waterborne, High-Solids and Powder Coatings Symposium, New Orleans 1996.

Furthermore, for example, the article by S. Sano et al., "Relationship between Viscoelastic Property and Scratch Resistance of Top-Coat Clear Film," Toso Kagaku 1994, 29 (12), pages 475–480, uses a washing brush test to determine the scratch resistance of different, heat-curing melamine/acrylate or isocyanate/acrylate systems and correlates the scratch resistance found with viscoelastic properties of the coating.

From the test results described in that article, the authors conclude that coatings exhibit good scratch resistance when either the so-called "inter-crosslinking molecular weight" is below 500 or when the glass transition temperature is 15° C. or less. It is necessary, however, in the case of clearcoat films in the automotive sector, for the glass transition temperature to be above 15° C. in order to achieve sufficient hardness of the coatings. The improvement in the scratch resistance by increasing the number of crosslinking points often leads in practice, moreover, to diverse problems, such as, for example, an inadequate storage stability and an often incomplete reaction of all crosslinking sites.

In the article by M. Rösler, E. Klinke and G. Kunz in Farbe+Lack, Volume 10, 1994, pages 837–843, too, the scratch resistance of various coatings is investigated by means of different test methods. The article found that, under a given load, hard coatings exhibit greater damage and thus lower scratch resistance than soft coatings.

Furthermore, in the conference report of B. V. Gregorovich and P. J. McGonical, Proceedings of the Advanced Coatings Technology Conference, Illinois, USA, Nov. 3–5, 1992, pages 121–125, it is found that increasing the plastic nature (toughness) of coatings improves the scratch resistance, owing to the improved plastic flow (scratch healing), although limits are imposed on the increase in plastic nature by the other properties of the coating.

Furthermore, P. Betz and A. Bartelt in Progress in Organic Coatings, 22 (1993), pages 27–37, disclose various methods of determining the scratch resistance of coatings. That article makes reference, furthermore, to the fact that the scratch resistance of coatings is influenced not only by the glass transition temperature but also, for example, by the homogeneity of the network.

That article proposes increasing the scratch resistance of clearcoat coatings by incorporating siloxane macromonomers, since these siloxane macromonomers lead to increased homogeneity of the clearcoat surface and, above 60° C., to an improved plastic flow.

The correlation between storage modulus and crosslinking density, finally, is known, for example, from Loren W. Hill, Journal of Coatings Technology, Vol. 64, No. 808, May 1992, pages 29 to 41. However, that article contains no statements or indications as to how scratch-resistant coatings can be obtained.

EP-A-540 884, furthermore, discloses a process for producing multicoat finishes, especially in the automotive sector, using free-radically and/or cationically polymerizable, silicone-containing clearcoats, in which the application of the clearcoat takes place under illumination with light having a wavelength of more than 550 nm or with exclusion of light, and in which, subsequently, the clearcoat film is cured by means of high-energy radiation. The surfaces obtained in this way are said to have good optical characteristics and a good scratch resistance. Further details on the level of the scratch resistance, and details of how the scratch resistance was determined, are, however, not contained in EP-A-540 884.

Finally, EP-A-568 967 also discloses a process for producing multicoat finishes, especially in the automotive sector, using radiation-curable clearcoats. According to EP-A-568 967, however, it is essential to the invention that in order to obtain clearcoat films having a high optical quality first of all a heat-curing clearcoat and thereafter a radiation-curable clearcoat is applied.

SUMMARY OF THE INVENTION

The object of the present invention is, therefore, to provide a process for producing scratch-resistant coatings. At the same time, the coating compositions employed in this process should have good storage stability (at least 8 weeks in the case of storage at 50° C.) and should lead to coatings which at the same time as the high scratch resistance exhibit high chemical resistance, good resistance to moisture, and good polishability. These coating compositions should, furthermore, be suitable as clearcoat and/or topcoat for the production of a multicoat finish, especially in the automotive sector. Furthermore, the fully cured coating materials should exhibit good weathering stability, a good acid/base resistance, and good resistance to bird droppings, and the like, a high gloss, and a good appearance.

Moreover, it should be possible to assess the scratch resistance of the cured coating objectively, independently of the particular test method chosen, on the basis of physical parameters. This method of determining the physical parameters should be able to be used under practical conditions and with sufficient accuracy should enable the scratch resistance to be characterized in a way which is at least adequate to visual evaluation.

This object is, surprisingly, achieved by a process for producing scratch-resistant coatings which comprises employing a coating composition which after curing has a storage modulus E' in the rubber-elastic range of at least $10^{7.6}$ Pa and a loss factor tan δ at 20° C. of not more than 0.10, the storage modulus E' and the loss factor tan δ having been measured by dynamic mechanical thermoanalysis on homogeneous free films having a film thickness of 40±10 μm.

The present specification relates, furthermore, to the use of the process for producing a multicoat finish and to coating compositions suitable for this process.

It is surprising and was not foreseeable that, merely by measuring the viscoelastic properties of free films by means of dynamic mechanical thermoanalysis (also referred to for short below as DMTA) there is available a universal, representative selection criterion for the provision of coating compositions which lead to scratch-resistant coatings. At the same time, the results of the DMTA measurements can be correlated with the results of the different test methods for scratch resistance, so that, on the basis solely of the results of the DMTA measurements, statements are possible about the results in other scratch resistance tests, such as, for example, the BASF brush test or the AMTEC test, or various test methods of the automakers.

It is surprising, furthermore, that even coating materials which at test temperature have only a moderate or even low plastic component but yet have a very high storage modulus in the rubber-elastic range nevertheless give rise to coatings having a high scratch resistance. Of particular advantage in this context is the fact that these coating compositions of the invention lead to coatings which in addition to the high scratch resistance exhibit good polishability, good moisture resistance, good weathering stability, good chemical resistance and acid/base resistance, and high gloss. Furthermore, the coating compositions of the invention possess good storage stability of 8 weeks in the case of storage at 50° C.

DETAILED DESCRIPTION OF THE INVENTION

In the text below, the coating compositions employed in the process of the invention for producing scratch-resistant coatings are elucidated first of all.

It is essential to the invention that the coating composition be selected such that the cured coating has a storage modulus E' in the rubber-elastic range of at least $10^{7.6}$ Pa, preferably of at least $10^{8.0}$ Pa and, with particular preference, of at least $10^{8.3}$ Pa and a loss factor at 20° C. of not more than 0.10, preferably not more than 0.06, the storage modulus E' and the loss factor tan δ having been measured by dynamic mechanical thermoanalysis on homogeneous free films having a film thickness of 40±10 μm. Said loss factor tan δ is defined as the quotient between the loss modulus E" and the storage modulus E'.

Dynamic mechanical thermoanalysis is a widely known measurement method for determining the viscoelastic properties of coatings and is described, for example, in Murayama, T., Dynamic Mechanical Analysis of Polymeric Material, Elsevier, New York, 1978 and Loren W. Hill, Journal of Coatings Technology, Vol. 64, No. 808, May 1992, pages 31 to 33.

The measurements can be carried out using, for example, the instruments MK II, MK III or MK IV from the company Rheometric Scientific.

The storage modulus E' and the loss factor tan δ are measured on homogeneous free films. The free films are prepared in conventional manner by applying the coating composition to, and curing it on, substrates to which the coating composition does not adhere. Examples of suitable substrates that may be mentioned are glass, Teflon and, in particular, polypropylene. Polypropylene has the advantage of ready availability and is therefore normally employed as support material.

The film thickness of the free films employed for the measurement is generally 40±10 μm.

The specific selection of the coating compositions by way of the value of the storage modulus in the rubber-elastic range and of the loss factor at 20° C. of the cured coating compositions simplifies the provision of coatings having the desired property profile of good scratch resistance along with good polishability, chemical and moisture resistance, and also weathering stability, since both parameters can be determined by means of simple DMTA measurements. Furthermore, the resulting coatings exhibit high gloss and resistance to acid and base which is comparable with the corresponding values of conventional, heat-cured coatings.

In this context it is surprising that even coating materials which at test temperature, have only a moderate or even low plastic component but yet have a high to very high storage modulus in the rubber-elastic range give rise to coatings having a high scratch resistance.

The scratch resistance of the cured coatings is preferably assessed as follows with the aid of the BASF brush test as described in FIG. 2 on page 28 of the article by P. Betz and A. Bartelt, Progress in organic Coatings, 22 (1993), pages 27–37, but modified in terms of the weight used (2000 g instead of the 280 g specified therein).

In this technique, the film surface is damaged using a weighted mesh fabric. The mesh fabric and the film surface are wetted generously with a detergent solution. The test panel is moved forward and backward in reciprocal movements under the mesh fabric by means of a motor drive.

To produce the test panels, an electrodeposition coating material is applied first of all in a film thickness of 18–22 μm, then a surfacer in a film thickness of 35–40 μm, then a black basecoat in a film thickness of 20–25 μm and, finally, the test coating composition in a film thickness of 40–45 μm, each of the films being cured. Following application of the coating materials, the panels are stored at room temperature for at least 2 weeks before the test is conducted.

The test element is an eraser (4.5×2.0 cm, broad side perpendicular to the direction of scratching) lined with nylon mesh fabric (No. 11, 31 μm mesh size, $T_g$ 50° C.). The applied weight is 2000 g.

Prior to each test the mesh fabric is replaced, with the running direction of the fabric meshes parallel to the direction of scratching. Using a pipette, about 1 ml of a freshly stirred 0.25% strength Persil solution is applied before the eraser. The rotational speed of the motor is set so that 80 double strokes are performed in a period of 80 s. After the test, the remaining washing liquid is rinsed off with cold tap water and the test panel is blown dry using compressed air. A measurement is made of the gloss in accordance with DIN 67530 before and after damage (direction of measurement perpendicular to the direction of scratching).

The coating compositions of the invention exhibit a markedly improved scratch resistance in the BASF brush test. Preferably, the coating composition of the invention in the cured state has a scratch resistance such that the delta gloss value following the BASF brush test of the cured coating composition applied over a basecoat is not more than 8, preferably not more than 4 and, with particular preference, is 0.

The acid/base resistance is tested with the aid of the so-called BART test (BASF ACID RESISTANCE TEST): The above-described steel panels, coated with electrodeposition coating material, surfacer, basecoat and topcoat, are subjected to further temperature loads in a gradient oven (30 minutes at 40° C., 50° C., 60° C. and 70° C.). Beforehand, the test substances (1%, 10% and 36% strength sulfuric acid; 6% strength sulfurous acid; 10% strength hydrochloric acid; 5% strength sodium hydroxide solution) are applied in a defined manner using a metering pipette. After the substances have been allowed to act, they are removed under running water and the damage is assessed visually after 24 h in accordance with a predetermined scale:

| Rating | Appearance |
|---|---|
| 0 | No defect |
| 1 | Slight marking |
| 2 | Marking/dulling/no softening |
| 3 | Marking/dulling/color change/softening |
| 4 | Cracks/incipient through-etching |
| 5 | Clearcoat removed |

Coating compositions having the corresponding abovementioned viscoelastic properties are preferably coating compositions curable by means of UV radiation or electron beams, especially by means of UV radiation. In addition, coating compositions based on ormocers, inter alia, are also suitable, for example.

These radiation-curable coating compositions normally include at least one and preferably two or more radiation-curable binders based in particular on ethylenically unsaturated prepolymers and/or ethylenically unsaturated oligomers, alone or together with one or more reactive diluents, with or without one or more photoinitiators and with or without customary auxiliaries and additives.

It is preferred to employ radiation-curable coating compositions whose viscosity at 23° C. is less than 100 s efflux time in the DIN 4 cup, with particular preference less than 80 s efflux time in the DIN 4 cup.

Examples of binders employed in these radiation-curable coating compositions are (meth)acrylofunctional (meth) acrylic copolymers, polyether acrylates, polyester acrylates, unsaturated polyesters, epoxy acrylates, urethane acrylates, amino acrylates, melamine acrylates, silicone acrylates and the corresponding methacrylates. It is preferred to employ binders which are free from aromatic structural units. The use of epoxy acrylates leads to coatings which, although hard and scratch resistant, generally exhibit a level of weathering stability that is in need of improvement. Preference, therefore, is given to using urethane (meth) acrylates and/or polyester (meth)acrylates, the use of aliphatic urethane acrylates being particularly preferred. Aqueous dispersions of the abovementioned radiation-curable binders are also suitable as binders in the coating compositions of the invention. Preference is also given to the use of substantially silicone-free and, with particular preference, totally silicone-free binders, since the resulting coating compositions have an overcoatability which is improved relative to that of silicone-containing coating compositions.

The polymers or oligomers employed as binders normally have a number-average molecular weight of from 500 to 50,000, preferably from 1000 to 5000.

The polymers and/or oligomers employed in the coating compositions of the invention preferably have at least 2 and, with particular preference, from 3 to 6 double bonds per molecule. The binders used preferably also have a double bond equivalent weight of from 400 to 2000, with particular preference from 500 to 900. Furthermore, the binders have a viscosity at 23° C. which is preferably from 250 to 11,000 mPa.s.

Polyester (meth)acrylates are known in principle to the skilled worker. They can be prepared by various methods. For example, acrylic acid and/or methacrylic acid can be employed directly as the acid component when synthesizing the polyesters. In addition there exists the possibility of employing hydroalkyl esters of (meth)acrylic acid as alcohol component directly when synthesizing the polyesters. Preferably, however, the polyester (meth)acrylates are prepared by acrylating polyesters. For example, it is possible first of all to synthesize hydroxyl-containing polyesters, which are then reacted with acrylic or methacrylic acid. It is also possible first of all to synthesize carboxyl-containing polyesters, which are then reacted with a hydroxyalkyl ester of acrylic or methacrylic acid. Unreacted (meth)acrylic acid can be removed from the reaction mixture by washing, distillation or, preferably, by reaction with an equivalent amount of a mono- or diepoxide compound using appropriate catalysts, such as triphenyl-phosphine, for example. For further details of the preparation of polyester acrylates reference may be made in particular to DE-A 33 16 593 and DE-A 38 36 370 and also to EP-A-54 105, DE-B 20 03 579 and EP-B-2866.

Polyether (meth)acrylates are likewise known in principle to the skilled worker. They can be prepared by various methods. For example, hydroxyl-containing polyethers which are esterified with acrylic acid and/or methacrylic acid can be obtained by reacting dihydric and/or polyhydric alcohols with various amounts of ethylene oxide and/or propylene oxide by well-known methods (cf. e.g. Houben-Weyl, Volume XIV, 2, Makromolekulare Stoffe II (1963)). It is also possible to employ products of the addition polymerization of tetrahydrofuran or of butylene oxide.

Flexibilization of the polyether (meth)acrylates and of the polyester (meth)acrylates is possible, for example, by reacting corresponding OH-functional prepolymers and/or oligomers (based on polyether or polyester) with relatively long-chain aliphatic dicarboxylic acids, especially aliphatic dicarboxylic acids having at least 6 carbon atoms, examples being adipic acid, sebacic acid, dodecanedioic acid and/or dimeric fatty acids. This flexibilization reaction can be carried out before or after the addition of acrylic and/or methacrylic acid onto the oligomers and/or prepolymers.

Epoxy (meth)acrylates, furthermore, are also well known to the skilled worker and therefore require no further elucidation. They are normally prepared by addition reaction of acrylic acid with epoxy resins, for example, with epoxy resins based on bisphenol A, or other commercially customary epoxy resins.

The epoxy (meth)acrylates can be flexibilized analogously by, for example, reacting corresponding epoxy-functional prepolymers and/or oligomers with relatively long-chain aliphatic dicarboxylic acids, especially aliphatic dicarboxylic acids having at least 6 carbon atoms, examples being adipic acid, sebacic acid, dodecanedioic acid and/or dimeric fatty acids. This flexibilization reaction can be carried out before or after the addition of acrylic and/or methacrylic acid onto the oligomers and/or prepolymers.

Urethane (meth)acrylates are likewise well known to the skilled worker and therefore require no further elucidation. They can be obtained by reacting a di- or polyisocyanate with a chain extender from the group of the diols/polyols and/or diamines/polyamines and/or dithiols/polythiols and/or alkanolamines and subsequently reacting the remaining free isocyanate groups with at least one hydroxyalkyl (meth) acrylate or hydroxyalkyl ester of other ethylenically unsaturated carboxylic acids.

The amounts of chain extender, di- and/or polyisocyanate and hydroxyalkyl ester are in this case preferably chosen such that 1.) the ratio of equivalents of the NCO groups to the reactive groups of the chain extender (hydroxyl, amino and/or mercaptyl groups) lies between 3:1 and 1:2, preferably at 2:1, and 2.) the OH groups of the hydroxyalkyl esters of the ethylenically unsaturated carboxylic acids are present in a stoichiometric amount in relation to the remaining free isocyanate groups of the prepolymer formed from isocyanate and chain extender.

It is also possible to prepare the polyurethane acrylates by first reacting some of the isocyanate groups of a di- or polyisocyanate of at least one hydroxyalkyl ester and then reacting the remaining isocyanate groups with a chain extender. In this case too the amounts of chain extender, isocyanate and hydroxyalkyl ester are chosen such that the ratio of equivalents of the NCO groups to the reactive groups of the chain extender lies between 3:1 and 1:2, preferably at 2:1, and the ratio of equivalents of the remaining NCO groups to the OH groups of the hydroxyalkyl ester is 1:1. All of the forms lying between these two processes are of course also possible. For example, some of the isocyanate groups of a diisocyanate can be reacted first of all with a diol, then a further portion of the isocyanate groups can be reacted with the hydroxyalkyl ester, and, subsequently, the remaining isocyanate groups can be reacted with a diamine.

These various preparation processes for the polyurethane acrylates are known (cf. e.g. EP-A-204 161) and therefore do not require any more detailed description.

The urethane (meth)acrylates can be flexibilized by, for example, reacting corresponding isocyanate-functional prepolymers or oligomers with relatively long-chain, aliphatic diols and/or diamines, especially aliphatic diols and/or diamines having at least 6 carbon atoms. This flexibilization reaction can be carried out before or after the addition of acrylic and/or methacrylic acid onto the oligomers and/or prepolymers.

Further examples which may be mentioned of suitable binders are the following products which are obtainable commercially:

Urethane acrylate Crodamer UVU 300 from Croda Resins Limited, Kent, GB;

aliphatic urethane triacrylate Genomer 4302 from Rahn Chemie, CH;

aliphatic urethane diacrylate Ebecryl 284 from UCB, Drogenbos, Belgium;

aliphatic urethane triacrylate Ebecryl 294 from UCB, Drogenbos, Belgium;

aliphatic urethane triacrylate Roskydal LS 2989 from Bayer AG, Germany;

aliphatic urethane diacrylate V94-504 from Bayer AG, Germany;

aliphatic hexafunctional urethane acrylate Viaktin VTE 6160 from Vianova, Austria;

aliphatic urethane diacrylate Laromer 8861 from BASF AG, and experimental modifications thereof.

In the coating compositions of the invention the binder is used preferably in an amount of from 5 to 90% by weight, with particular preference from 20 to 70% by weight, based in each case on the overall weight of the coating composition in the case of clearcoats and on the weight of the coating composition minus pigments and fillers in the case of pigmented systems.

The coating compositions of the invention may if desired include one or more reactive diluents. The reactive diluents can be ethylenically unsaturated compounds. The reactive diluents can be mono-, di- or polyunsaturated. They serve customarily to influence the viscosity and the technical properties of the coating material, such as the crosslinking density, for example.

The reactive diluent or diluents is or are employed in the coating compositions of the invention preferably in an amount of from 0 to 70% by weight, with particular preference from 15 to 65% by weight, based in each case on the overall weight of the coating composition in the case of clearcoats and on the weight of the coating composition minus pigments and fillers in the case of pigmented systems.

Examples of reactive diluents employed are (meth)acrylic acid and esters thereof, maleic acid and its esters and/or monoesters, vinyl acetate, vinyl ethers, vinylureas, and the like. Examples are alkylene glycol di(meth)acrylate, polyethylene glycol di(meth)acrylate, 1,3-butanediol di(meth) acrylate, vinyl (meth)acrylate, allyl (meth)acrylate, glycerol tri(meth)acrylate, trimethylolpropane tri(meth)acrylate, trimethylolpropane di(meth)acrylate, styrene, vinyltoluene, divinylbenzene, pentaerythritol tri(meth)acrylate, pentaerythritol tetra(meth)acrylate, dipropylene glycol di(meth) acrylate, hexanediol di(meth)acrylate, ethoxyethoxyethyl acrylate, N-vinylpyrrolidone, phenoxyethyl acrylate, dimethyl-aminoethyl acrylate, hydroxyethyl (meth)acrylate, butoxyethyl acrylate, isobornyl (meth)acrylate, dimethylacrylamide and dicyclopentyl acrylate, and the long-chain linear diacrylates described in EP-A-250 631 having a molecular weight from 400 to 4000, preferably from 600 to 2500. The two acrylate groups can be separated, for example, by a polyoxybutylene structure. It is also possible to employ 1,12-dodecyl diacrylate and the reaction product of 2 mol of acrylic acid with one mole of a dimeric fatty alcohol having generally 36 carbon atoms. Mixtures of said monomers are also suitable.

Preferred reactive diluents employed are mono- and/or diacrylates, such as, for example, isobornyl acrylate, hexanediol diacrylate, tripropylene glycol diacrylate, Laromer® 8887 from BASF AG and Actilane® 423 from Akcros Chemicals Limited, GB. It is particularly preferred to employ isobornyl acrylate, hexanediol diacrylate and tripropylene glycol diacrylate.

The coating compositions of the invention may comprise, preferably in proportions of from 0 to 10% by weight, preferably 2 to 6% by weight in formulations cured by means of UV radiation, said percentages being based on the weight of the coating composition minus pigments and fillers, of customary photoinitiators employed in radiation-curable coating compositions, examples being benzophenones, benzoins or benzoin ethers, preferably benzophenone in UV formulations. It is also possible, for example, to use the products obtainable commercially under the names Irgacure® 184, Irgacure® 1800 and Irgacure® 500 from Ciba Geigy, Grenocure® MBF from Rahn and Lucirin® TPO from BASF AG.

The coating compositions of the invention may further include customary auxiliaries and/or additives, examples being light stabilizers (e.g., HALS compounds, benzotriazoles, oxalanilides and the like), slip additives, polymerization inhibitors, dulling agents, defoamers, leveling agents and film-forming auxiliaries, examples being cellulose derivatives, or other additives that are commonly employed in topcoats. These customary auxiliaries and/or additives are usually employed in an amount of up to 15% by weight, preferably from 2 to 9% by weight, based on the weight of the coating composition minus pigments and minus fillers.

The coating compositions of the invention are employed in particular as clearcoats, so that they normally contain only transparent fillers, if any at all, and no hiding pigments. Use in the form of pigmented coating compositions is, however, a further possibility. In that case the coating compositions contain from 2 to 40% by weight, based on the total weight of the coating composition, of one or more pigments. Furthermore, the coating compositions may in this case also contain from 1 to 20% by weight, based on the total weight of the coating composition, of one or more fillers.

The coating compositions of the invention can be applied to glass and a wide variety of metal substrates, such as, for example, aluminum, steel, various iron alloys and the like. Preferably, they are employed as a clearcoat or topcoat in the field of automotive finishing (automotive OEM finishing and automotive refinishing). In addition to their application to a wide variety of metals, the coating compositions can of course also be applied to other substrates, such as, for example, wood, paper, plastics, mineral substrates or the like. They are, furthermore, also suitable for use in the field of the coating of packaging containers and in the field of the coating of films for the furniture industry and the like.

To produce coatings on metal substrates, the coating compositions of the invention are applied preferably to metal panels or metal strips which have been primed or coated with a basecoat. As the primer, the customarily used primers can be used. As the basecoat, both conventional and aqueous basecoats are employed. Furthermore, it is also possible to apply the coating compositions of the invention to metal substrates which have been coated first with an electrodeposition coating and then with a functional layer and, wet-on-wet, with a basecoat. In the case of the specified processes it is, however, generally necessary for the basecoat and the surfacer and/or the functional layer to be stoved prior to application of the coating composition of the invention.

The present invention therefore also provides a process for producing multicoat finishes in which (1) a pigmented basecoat is applied to the substrate surface, (2) the basecoat film is dried or crosslinked, (3) a transparent topcoat is applied atop the resultant basecoat film, and then (4) the topcoat film is cured, which comprises using a coating composition of the invention as the topcoat.

In this context, the coating compositions of the invention are particularly suitable as a topcoat for producing a multicoat finish in the sector of the automotive OEM finishing and/or automotive refinishing of car bodies and parts thereof and also truck bodies, and the like.

The curing of the paint films takes place by means of radiation, preferably by means of UV radiation. The apparatus and conditions for these curing methods are known from the literature (cf. e.g. R. Holmes, U.V. and E.B. Curing Formulations for Printing Inks, Coatings and Paints, SITA Technology, Academic Press, London, United Kingdom 1984) and require no further description.

The invention is elucidated further below with reference to exemplary embodiments. In these embodiments, all parts are by weight unless expressly stated otherwise.

EXAMPLES 1 TO 4

The coating compositions 1 to 4 are prepared from the components indicated in Table 1 with intensive stirring by means of a dissolver or a stirrer. A free film of these clearcoats 1 to 4, applied over polypropylene in a film thickness of 40±10 μm, was prepared and examined by means of DMTA. The film is cured in this case using 2 Hg UV lamps. The irradiated dose is approximately 1800 $mJ/cm^2$. The viscoelastic parameters of the homogeneous, cured free films were determined by means of DMTA measurements. The resulting storage modulus E' in the rubber-elastic range and the loss factor tan δ at 20° C. are each indicated in Table 2.

Furthermore, the scratch resistance of the cured coating from these coating compositions of Examples 1 to 4 was determined with the aid of the BASF brush test via measurement of the reduction in gloss. For this purpose, the respective coating composition was applied in a dry-film thickness of 40–45 μm to a metal panel which had been coated beforehand with a commercial electrodeposition coating from BASF Lacke+Farben AG, Munster (film thickness 18–22 μm), with the commercial surfacer Ecoprime 130 from BASF Lacke+Farben AG, Munster (stoved at 130° C. for 30 minutes; dry-film thickness 35–40 μm) and with a commercial aqueous basecoat from BASF Lacke+Farben AG, Münster (stoved at 130° C. for 30 minutes; dry-film thickness 2–25 μm) and was cured by means of UV radiation (irradiated energy 1800 $mJ/cm^2$).

The BASF brush test was used to determine the scratch resistance of this system. The results are likewise indicated in Table 2. Table 2 also indicates the polishability, the acid/base resistance, the storage stability and the self-overcoatability.

COMPARATIVE EXAMPLE 1

1. Preparing an Acrylate Resin 758 g of an aromatic hydrocarbon fraction having a boiling range of 158° C.–172° C. are weighed out into a laboratory reactor having a capacity of 4 l and equipped with a stirrer, two dropping funnels for the monomer mixture and initiator solution, respectively, nitrogen inlet pipe, thermometer and reflux condenser. The solvent is heated to 140° C. On reaching 140° C., a monomer mixture comprising 1108 g of ethylhexyl acrylate, 55 g of styrene, 404 g of 4-hydroxybutyl acrylate and 16 g of acrylic acid is metered into the reactor at a uniform rate over the course of 4 hours and an initiator solution of 63 g of t-butyl perethylhexanoate in 95 g of the aforementioned aromatic solvent is metered into the reactor at a uniform rate over the course of 4.5 hours.

The metered addition of the monomer mixture and of the initiator solution is commenced simultaneously. After the end of the metered addition of initiator, the reaction mixture is held at 140° C. for 2 hours more and then cooled. The resulting polymer solution has a solids content of 62% (determined in a circulating-air oven at 130° C. for 1 h), an acid number of 9 and a viscosity of 21 dPas (measured on the polymer solution in the form of a 60% dilution in the aforementioned aromatic solvent, using an ICI cone-and-plate viscometer at 23° C.).

2. Preparing a Blocked Isocyanate 1

504.0 g of a commercially customary isocyanurate trimer of hexamethylene diisocyanate and 257.2 g of the above-described aromatic solvent are weighed out into the apparatus described above, equipped with a metering vessel and a reflux condenser. The solution is heated to 50° C. Then a mixture of 348.0 g of diethyl malonate, 104.0 g of ethyl acetoacetate and 2.5 g of a 50% strength solution of sodium p-dodecylphenoxide in xylene are metered from the metering vessel into the solution over a period of 2 hours at a rate such that the temperature does not exceed 70° C. The mixture is then heated slowly to 90° C. and this temperature is maintained for 6 hours. Then a further 2.5 g of sodium p-dodecylphenoxide solution are added and the mixture is held at 90° C. until the NCO group content of the reaction mixture has reached 0.48%. At that point, 35.1 g of n-butanol are added. The resulting solution has a nonvolatile content of 59.6% (measured in a circulating-air oven at 130° C. for 60 minutes) and a viscosity of 590 mPa·s, measured in an ICI cone-and-plate viscometer at 23° C.

3. Preparing a Blocked Isocyanate 2

The preparation of the blocked isocyanate 2 is analogous to the preparation of the blocked isocyanate 1 with the sole difference that, instead of 504.0 g of the hexamethylene diisocyanate trimer, 666.1 g of a commercially customary isocyanurate trimer of isophorone diisocyanate are now employed.

4. Preparing a Transparent Topcoat

The transparent topcoat is prepared by weighing out acrylate resin, isocyanate 1, isocyanate 2 and amino resin in the order indicated below and mixing them thoroughly by stirring with a laboratory turbine stirrer, then adding the first portion of xylene and incorporating it likewise by thorough stirring. The UV absorber and the free-radical scavenger are premixed separately with (the second portion of) xylene until fully dissolved and then are added to the first part of the formulation and likewise incorporated by thorough stirring. Then n-butanol and the leveling agent are added and mixed in thoroughly. If necessary for its application, the resulting coating material is adjusted with xylene to a viscosity of 23 sec, measured in the DIN 4 cup at 20° C.

38.5 parts of acrylate resin
28.6 parts of Setamine US-138, commercial melamine resin
3.6 parts of isocyanate 1
4.0 parts of isocyanate 2
9.8 parts of xylene
1.7 parts of benzotriazole-based UV absorber
1.5 parts of a commercially customary light stabilizer based on a sterically hindered amine
5.3 parts of xylene
5.0 parts of butanol
2.0 parts of leveling agent (5% strength solution of a polyether-substituted polydimethylsiloxane in xylene)

In analogy to Example 1, a homogeneous free film of this coating composition C1 film with a layer thickness of 40±10 μm, applied over polypropylene, was prepared and investigated by means of DMTA (curing conditions 20 min/140° C.).

The resultant values of the storage modulus E' in the rubber-elastic range and of the loss factor tan δ at 20° C. are shown in Table 2.

Table 2 also indicates the storage stability of the coating composition and also the results of testing of the cured coating in respect of polishability, moisture resistance, acid/base resistance, and overcoatability.

Furthermore, the BASF brush test was used to determine the scratch resistance of the cured coating from this coating composition C1, in analogy to Example 1, via measurement of the drop in gloss. For this purpose, the coating composition C1 was applied in a dry-film thickness of 40–45 μm to the metal panel described in Example 1, provided with an electrodeposition coating, surfacer and a basecoat, and was heat-cured together with the basecoat (20 min, 140° C.). The BASF brush test was then used to determine the scratch resistance of this system. The Δ gloss values found are likewise shown in Table 2.

COMPARATIVE EXAMPLE 2

A coating composition C2 is prepared from the following components with intensive stirring by means of a dissolver or stirrer, in analogy to Example 1 of EP-A-540 884:

44.5 parts of Novacure 3200 (aliphatic epoxy acrylate from Interorgana)
32.2 parts of Ebecryl 264 (aliphatic urethane acrylate from UCB)
3.0 parts of Irgacure 184 (photoinitiator from CIBA GEIGY)
10.0 parts of dipropylene glycol diacrylate
10.0 parts of trimethylolpropane triacrylate
0.3 part of Ebecryl 350 (silicone acrylate from UCB)

In analogy to Example 1, a free film of this coating composition C2 with a film thickness of 40±10 μm, applied over polypropylene, was prepared, and was cured by means of UV radiation (irradiated energy 1800 $mJ/cm^2$) and investigated by means of DMTA. The resultant values of the storage modulus E' in the rubber-elastic range and of the loss factor tan δ at 20° C. are shown in Table 2.

Table 2 also indicates the result of the testing of the cured coating in respect of its overcoatability.

Furthermore, the BASF brush test was used to determine the scratch resistance of the cured coating from this coating composition C2, in analogy to Example 1, via measurement of the drop in gloss. For this purpose, the coating composition C2 was applied in a dry-film thickness of 40–45 μm to the metal panel described in Example 1, provided with an electrodeposition coating, surfacer and a basecoat, and was cured by means of UV radiation (irradiated energy 1800 $mJ/cm^2$). The BASF brush test was then used to determine the scratch resistance of this system. The Δ gloss values found are likewise shown in Table 2.

COMPARATIVE EXAMPLE 3

1. Preparing an Acrylate Resin 879 g of an aromatic hydrocarbon fraction having a boiling range of 158° C.–172° C. are weighed out into a laboratory reactor having a capacity of 4 l and equipped with a stirrer, two dropping funnels for the monomer mixture and initiator solution, respectively, nitrogen inlet pipe, thermometer and reflux condenser. The solvent is heated to 140° C. On reaching 140° C., an initiator mixture 1 comprising 87 g of the above-described aromatic solvent mixture and 87 g of t-butyl peroctoate is metered into the reactor at a uniform rate over the course of 4.75 hours. 15 minutes after beginning the addition of the initiator mixture, a monomer mixture of 819 g of butyl methacrylate, 145 g of methyl methacrylate and 484 g of hydroxypropyl methacrylate is metered in over the course of 4 hours. After the end of the metered addition of initiator, the reaction mixture is held at 140° C. for 2 hours more and then cooled. The resulting polymer solution has a solids content of 60% (determined in a circulating-air oven at 130° C. for 1 h) and an OH number of 130 (based on solids content).

2. Preparing an Isocyanate 23 g of a commercially customary 90% strength isocyanurate trimer of hexamethylene diisocyanate and 64 g of a commercially customary 70% strength isocyanurate trimer of isophorone diisocyanate are mixed thoroughly with 6.5 g of butyl acetate and 6.5 g of the above-described aromatic solvent mixture.

3. Preparing a Transparent Topcoat

The transparent topcoat is prepared by weighing out the acrylate resin and mixing it thoroughly by stirring with a laboratory turbine stirrer, then adding the solvents except for xylene, and the leveling agent and incorporating them likewise by thorough stirring. The UV absorber and the free-radical scavenger are premixed separately with xylene until fully dissolved and then are added to the first part of the formulation and likewise incorporated by thorough stirring. The isocyanate is added not until shortly before application. If necessary for its application, the resulting coating material is adjusted with xylene to a viscosity of 23 sec, measured in the DIN 4 cup at 20° C.

78.0 parts of acrylate resin
35.0 parts of isocyanate
8.0 parts of butyl glycol acetate
5.5 parts of butyl acetate
1.5 parts of benzotriazole-based UV absorber
1.0 part of a commercially customary light stabilizer based on a sterically hindered amine
3.0 parts of xylene
3.0 parts of leveling agent (5% strength solution of a polyether-substituted polydimethylsiloxane in xylene)

In analogy to Example 1, a free film of this coating composition C3 with a film thickness of 40±10 $\mu$m, applied over polypropylene, was prepared and investigated by means of DMTA (curing conditions 20 min/140° C.).

The resultant values of the storage modulus E' in the rubber-elastic range and of the loss factor tan δ at 20° C. are shown in Table 2.

Table 2 also indicates the storage stability of the coating composition C3 and also the results of testing of the cured coating in respect of polishability, moisture resistance and chemical resistance.

Furthermore, the BASF brush test was used to determine the scratch resistance of the cured coating from this coating composition C3, in analogy to Example 1, via measurement of the drop in gloss. For this purpose, the coating composition C3 was applied in a dry-film thickness of 40–45 $\mu$m to the metal panel described in Example 1, provided with an electrodeposition coating, surfacer and a basecoat, and was heat-cured together with the basecoat (20 min, 140° C.). The BASF brush test was then used to determine the scratch resistance of this system. The Δ gloss values found are likewise shown in Table 2.

SUMMARY OF THE TEST RESULTS

The high scratch resistance of the scratch-resistance-optimized conventional clearcoat (Comparative Example 1) is achieved with an early rise in the tan δ value. This is associated, however, with other disadvantages, such as, for example, a poorer storage stability, poor polishability and poor chemical resistance.

The coating composition of Comparative Example C2 features a high tan δ value at 20° C. and good scratch resistance but at the same time has poor overcoatability.

The extremely scratch-sensitive two-component clearcoat (Comparative Example 3), which, however, features good acid resistance at the same time, by contrast has a late rise in the tan δ value and a low value for the storage modulus E' in the rubber-elastic region.

In comparison to the scratch-resistance-optimized conventional clearcoat of Comparative Example 1, the coating composition of the invention is notable for a higher storage modulus E' in the rubber-elastic range, of at least $10^{7.6}$ Pa, and a later rise in the loss factor tans and a correspondingly low tan δ value at 20° C. Thus it is possible to provide a coating composition which leads to coatings having outstanding scratch resistance (e.g., little or no scratching in the BASF brush test, Δ gloss less than or equal to 8, improved scratch resistance in the AMTEC brush test) in combination with good polishability and good chemical and moisture resistance. Furthermore, the coating compositions of the invention are notable for improved storage stability in comparison to the scratch-resistance-optimized conventional clearcoat of Comparative Example 1.

TABLE 1

Composition of the coating compositions of Examples 1 to 4

| | Example | | | |
|---|---|---|---|---|
| | 1 | 2 | 3 | 4 |
| Viaktin1) | 76.0 | — | — | — |
| Larom. 87772) | — | 41.6 | — | — |
| Larom. PO84F3) | — | 10.0 | — | — |
| Ebec. 51294) | — | 10.0 | — | — |
| Urethane5) | — | — | — | 76.0 |
| V94/504-26) | — | — | 50.0 | — |
| HDDA7) | 20.0 | 31.9 | 45.0 | 20.0 |
| Irg. 1848) | 4.0 | — | — | 4.0 |
| Irg. 5009) | — | 4.0 | — | — |
| Gen. MBF10) | — | — | 4.0 | — |
| Add.11) | — | 2.0 | — | — |
| Byk 33312) | — | 0.5 | — | — |
| Byk 30613) | — | — | 1.0 | — |
| Total | 100.0 | 100.0 | 100.0 | 100.0 |

Key to Table 1:
1): Viaktin VTE 6160, commercial aliphatic hexafunctional urethane acrylate from Vianova
2): Laromer ® 8777, commercial difunctional epoxy acrylate from BASF AG Key to Table 1:
1): Viaktin VTE 6160, commercial aliphatic hexafunctional urethane acrylate from Vianova
2): Laromer® 8777, commercial difunctional epoxy acrylate from BASF AG
3): Laromer® PO84F, commercial amine-modified polyether acrylate from BASF AG
4): Ebecryl® 5129, commercial aliphatic hexafunctional urethane acrylate from UCB
5): Aliphatic urethane diacrylate from BASF AG based on Laromer® 8861, but dissolved in hexanediol diacrylate instead of dipropylene glycol diacrylate 6): V94/504-2, aliphatic difunctional urethane acrylate from Bayer AG
7): Hexanediol diacrylate
8): Irgacure® 184 from Ciba Geigy, commercial photoinitiator
9): Irgacure® 500 from Ciba Geigy, commercial photoinitiator
10): Genocure® MBF from Rahn, commercial photoinitiator
11): 3-Methacryloyloxypropyltrimethoxysilane
12): Byk 333, commercial siloxane-based slip additive
12): Byk 306, commercial siloxane-based slip additive

TABLE 2

Test results of the coatings of Examples 1 to 4 and of Comparative Examples C1 to C3

| Example | log E' (E' in Pa) | tanδ (20° C.) | Δ gloss | Polishability | Moisture resistance | Chemical resistance | Storage stability | Overcoatability |
|---|---|---|---|---|---|---|---|---|
| 1 | 8.37 | 0.05 | 0 | ○ | ○ | ○–Δ | ○ | Δ |
| 2 | 8.34 | 0.05 | 3 | ○ | ○ | ○–Δ | ○ | Δ |
| 3 | 8.25 | 0.06 | 6 | ○ | ○ | ○–Δ | ○ | Δ |
| 4 | 7.7 | 0.07 | 8 | ○ | ○ | ○–Δ | ○ | Δ |
| C1 | 7.0 | 0.39 | 6 | Δ | Δ | Δ | Δ | ○ |
| C2 | 7.69 | 0.11 | 4.5 | — | — | — | — | X |
| C3 | 7.1 | 0.04 | 48 | ○ | ○ | ○ | ○ | ○ |

Ratings:
○: Very good
○–Δ: Good
Δ: Satisfactory
X: Deficient

Key to Table 2:

Δ gloss: Difference between the gloss value before and directly after subjection to the BASF brush test Polishability: Visual assessment of the coating surface, after polishing with polishing paste, for the appearance of traces of abrasion Moisture resistance: Measured with the aid of the constant climatic test by storage over 10 days at 40° C. and 100% relative atmospheric humidity Chemical resistance: Measured with the aid of the above-described BART test Storage stability: Testing of the viscosity of the coating composition as efflux viscosity in the DIN 4 cup at 23° C. after storage for 8 weeks at 50° C.: good storage stability means no significant increase in viscosity after storage Overcoatability: Visual assessment, and assessment with the aid of the cross-hatch test, of the overcoatability of the coating material with itself

What is claimed is:

1. A process for producing a scratch-resistant coating on a substrate, comprising the steps of:

applying to the substrate and then curing a coating composition which after curing has a storage modulus E' in the rubber-elastic range of at least about $10^{7.6}$ Pa and a loss factor tan δ at 20° C. of not more than about 0.10, the storage modulus E' and the loss factor having been measured by dynamic mechanical thermoanalysis on free films having a film thickness of 40±10 μm.

2. A process as claimed in claim 1, wherein the coating composition in the cured state has a scratch resistance such that the delta gloss value following the BASF brush test of the cured coating composition applied over a basecoat is 0.

3. A process as claimed in claim 1, wherein the coating composition in the cured state has a storage modulus E' in the rubber-elastic range of at least about $10^{8.0}$ Pa and/or a loss factor tan δ at 20° C. of not more than about 0.06.

4. A process as claimed in claim 1, wherein the coating composition in the cured state has a scratch resistance such that the delta gloss value following the BASF brush test of the cured coating composition applied over a basecoat is not more than 8.

5. A process as claimed in claim 1, wherein the coating composition is cured by UV radiation or electron beams.

6. A process as claimed in claim 5, wherein the coating composition has a viscosity at 23° C. of less than about 100 s efflux time in the DIN 4 cup.

7. A process as claimed in claim 5, wherein the coating composition comprises one or more binders selected from the group consisting of polyester (meth)acrylates, polyurethane (meth)acrylates, and substantially silicone-free binders.

8. A process as claimed in claim 5, wherein the coating composition comprises one or more mono- and/or diacrylates as reactive diluents.

9. A process as claimed in claim 5, wherein the topcoat composition has a viscosity at 23° C. of less than about 80 s efflux time in the DIN 4 cup.

10. A process as claimed in claim 1, wherein the coating composition in the cured state has a scratch resistance such that the delta gloss value following the BASF brush test of the cured coating composition applied over a basecoat is not more than 4.

11. A process as claimed in claim 1, wherein the coating composition in the cured state has a storage modulus E' in the rubber-elastic range of at least about $10^{8.3}$ Pa.

12. A coating composition which in the cured state has a storage modulus E' in the rubber-elastic range of at least about $10^{7.6}$ Pa and a loss factor tan δ at 20° C. of not more than about 0.10, the storage modulus E' and the loss factor having been measured by dynamic mechanical thermoanalysis on free films having a film thickness of 40±10 μm.

13. A coating composition as claimed in claim 12, wherein the coating composition in the cured state has a storage modulus E' in the rubber-elastic range of at least about $10^{8.3}$ Pa.

14. A coating composition as claimed in claim 12, wherein the coating composition in the cured state has a storage modulus E' in the rubber-elastic range of at least about $10^{8.0}$ Pa and/or a loss factor tan δ at 20° C. of not more than about 0.06.

15. A coating composition as claimed in claim 12, wherein the coating composition in the cured state has a scratch resistance such that the delta gloss value following the BASF brush test of the cured coating composition applied over a basecoat is 0.

16. A coating composition as claimed in claim 12, wherein the coating composition in the cured state has a scratch resistance such that the delta gloss value following the BASF brush test of the cured coating composition applied over a basecoat is not more than 8.

17. A coating composition as claimed in claim 12, wherein the coating composition in the cured state has a scratch resistance such that the delta gloss value following the BASF brush test of the cured coating composition applied over a basecoat is not more than 4.

18. A process for producing multicoat finishes, comprising steps of (1) applying a pigmented basecoat composition to a substrate surface, (2) drying or crosslinking the applied basecoat, (3) applying a transparent topcoat composition onto the resultant basecoat film, and then (4) curing the applied topcoat, wherein the cured topcoat has a storage modulus E' in the rubber-elastic range of at least about $10^{7.6}$ Pa and a loss factor tan δ at 20° C. of not more than about 0.10, the storage modulus E' and the loss factor having been measured by dynamic mechanical thermoanalysis on free films having a film thickness of 40±10 μm.

19. A process as claimed in claim 9, wherein the substrate is an automotive component.

20. A process as claimed in claim 18, wherein the topcoat is cured by UV radiation or electron beams.

21. A process as claimed in claim 18, wherein the topcoat composition has a viscosity at 23° C. of less than about 100 s efflux time in the DIN 4 cup.

22. A process as claimed in claim 18, wherein the topcoat composition comprises one or more binders selected from the group consisting of polyester (meth)acrylates, polyurethane (meth)acrylates, and substantially silicone-free binders.

23. A process as claimed in claim 18, wherein the topcoat composition comprises one or more mono- and/or diacrylates as reactive diluents.

* * * * *